US 9,674,071 B2

(12) United States Patent
Anand et al.

(10) Patent No.: US 9,674,071 B2
(45) Date of Patent: Jun. 6, 2017

(54) HIGH-PRECISION PACKET TRAIN GENERATION

(71) Applicant: TELEFONAKTIEBOLAGET L M ERICSSON (PUBL), Stockholm (SE)

(72) Inventors: Prashant Anand, Bangalore (IN); Vinayak Joshi, Bangalore (IN); Vivek Srivastava, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

(21) Appl. No.: 14/628,121

(22) Filed: Feb. 20, 2015

(65) Prior Publication Data

US 2016/0248656 A1    Aug. 25, 2016

(51) Int. Cl.
*H04L 12/26* (2006.01)
*H04L 12/815* (2013.01)

(52) U.S. Cl.
CPC .............. *H04L 43/50* (2013.01); *H04L 47/22* (2013.01)

(58) Field of Classification Search
CPC ................................ H04L 43/50; H04L 47/22
USPC .......................................................... 370/249
See application file for complete search history.

(56) References Cited

U.S. PATENT DOCUMENTS

| | | | |
|---|---|---|---|
| 5,634,004 A * | 5/1997 | Gopinath | G06F 15/17375 710/317 |
| 7,760,636 B1 | 7/2010 | Cheriton | |
| 7,957,295 B2 * | 6/2011 | Varma | H04L 12/413 370/231 |
| 9,203,763 B2 | 12/2015 | Anand et al. | |
| 2008/0002594 A1 | 1/2008 | Forsberg et al. | |
| 2010/0296396 A1 | 11/2010 | Brolin | |
| 2010/0329250 A1 | 12/2010 | Olesinski et al. | |
| 2011/0222431 A1 | 9/2011 | Oue | |
| 2012/0014396 A1 | 1/2012 | Bae | |

(Continued)

FOREIGN PATENT DOCUMENTS

EP        2747346 A1    6/2014
WO    WO 2009/118602 A2    10/2009

(Continued)

OTHER PUBLICATIONS

N. McKeown, "Software-defined Networking", Infocom, Apr. 2009, 64 Pages.

(Continued)

*Primary Examiner* — Stephen J Clawson

(57) ABSTRACT

A method for generating a high-precision packet train includes configuring an initial packet generation flow of duration T in a network node and sending a packet to a loopback port to initiate the initial packet generation flow in the network node, where the loopback port loops packets back to the network node or recirculates packets within the network node, and where the loopback port is configured for traffic shaping that establishes a pre-determined inter-packet gap for packets output by the loopback port. The method further includes configuring a main packet generation flow having a duration t1 that commences on expiration of the duration T. Looped back packets in the network node are sent to the loopback port for the entirety of durations T and t1, while one copy of each looped back packet in the network node is sent to a network port during the duration t1.

22 Claims, 10 Drawing Sheets

(56) References Cited

U.S. PATENT DOCUMENTS

| | | | |
|---|---|---|---|
| 2012/0128000 A1 | 5/2012 | Baillargeon | |
| 2013/0230060 A1 | 9/2013 | Bernhard et al. | |
| 2014/0169166 A1 | 6/2014 | Anand et al. | |
| 2014/0310390 A1 | 10/2014 | Sorenson, III et al. | |
| 2015/0078386 A1 | 3/2015 | Jackson | |
| 2015/0249587 A1 | 9/2015 | Kozat | |
| 2016/0080243 A1* | 3/2016 | Kodama | H04L 41/0806 370/252 |
| 2016/0218917 A1* | 7/2016 | Zhang | H04L 49/35 |
| 2016/0226742 A1 | 8/2016 | Apathotharanan | |
| 2016/0285750 A1 | 9/2016 | Saquib | |

FOREIGN PATENT DOCUMENTS

| | | |
|---|---|---|
| WO | 2014/046875 A1 | 3/2014 |
| WO | 2014/139564 A1 | 9/2014 |

OTHER PUBLICATIONS

D. Katz and D. Ward, "Bidirectional Forwarding Detection (BFD)", Internet Engineering Task Force, Request for Comments: 5880, Jun. 2010, 49 pages.
D. Katz and D. Ward, "Bidirectional Forwarding Detection (BFD) for IPv4 and IPv6 (Single Hop)", Internet Engineering Task Force, Request for Comments: 5881, Jun. 2010, 7 pages.
D. Katz and D. Ward, "Generic Application of Bidirectional Forwarding Detection (BFD)", Internet Engineering Task Force, Request for Comments: 5882, Jun. 2010, 17 pages.
D. Katz and D. Ward, "Bidirectional Forwarding Detection (BFD) for Multihop Paths", Internet Engineering Task Force, Request for Comments: 5883, Jun. 2010, 6 pages.
"Ethernet ring protection switching", Series G: Transmission Systems and Media, Digital Systems and Networks, International Telecommunication Union, ITU-T, G.8032/Y.1344, Feb. 2012, 104 pages.
"OpenFlow Switch Specification Version 1.3.5 (Protocol version 0x04)", Open Networking Foundation, Mar. 26, 2015, pp. 177 pages.
P. Anand et al., "High-Precision Packet Train Generation", U.S. Appl. No. 14/628,121, filed Feb. 20, 2015, 50 pages.
S. Narikawa, "G.8032: Ethernet Ring protection characteristics, architectures and the Ring APS protocol", Joint ITU-T/IEEE Workshop on the Future of Ethernet Transport, IEEE, May 28, 2010, 23 pages.
J. Postel, "User Datagram Protocol", RFC: 768, Aug. 28, 1980, 3 pages.
"Transmission Control Protocol, DARPA Internet Program Protocol Specification", Sep. 1981, RFC: 793, Information Sciences Institute, University of Southern California, Marina del Rey, California, 91 pages.
T. Socolofsky and C. Kale., "A TCP/IP Tutorial", Network Working Group, Request for Comments: 1180, Jan. 1991, 28 pages.
S. Deering and R. Hinden, "Internet Protocol, Version 6 (IPv6) Specification", Network Working Group, Request for Comments: 2460, Dec. 1998, 39 pages.
K. Nichols, et al., "Definition of the Differentiated Services Field (DS Field) in the IPv4 and IPv6 Headers", Network Working Group, Request for Comments: 2474, Dec. 1998, 20 pages.
S. Blake, et al., "An Architecture for Differentiated Services", Network Working Group, Request for Comments: 2475, Dec. 1998, 36 pages.
J. Heinanen, et al., "Assured Forwarding PHB Group", Network Working Group, Request for Comments: 2597, Jun. 1999, 11 pages.
D. Borman, et al., "IPv6 Jumbograms", Network Working Group, Request for Comments: 2675, Aug. 1999, 9 pages.
D. Black, "Differentiated Services and Tunnels", Network Working Group, Request for Comments: 2983, Oct. 2000, 14 pages.
K. Nichols and B. Carpenter, "Definition of Differentiated Services per Domain Behaviors and Rules for their Specification", Network Working Group, Request for Comments: 3086, Apr. 2001, 24 pages.
D. Black, et al., "Per Hop Behavior Identification Codes", Network Working Group, Request for Comments: 3140, Jun. 2001, 8 pages.
B. Davie, et al., "An Expedited Forwarding PHB (Per-Hop Behavior)", Network Working Group, Request for Comments: 3246, Mar. 2002, 16 pages.
A. Charny, et al., "Supplemental Information for the New Definition of the EF PHB (Expedited Forwarding Per-Hop Behavior)", Network Working Group, Request for Comments: 3247, Mar. 2002, 24 pages.
D. Grossman, "New Terminology and Clarifications for Diffserv", Network Working Group, Request for Comments: 3260, Apr. 2002, 10 pages.
F. Baker, et al., "Management Information Base for the Differentiated Services Architecture", Network Working Group, Request for Comments: 3289, May 2002, 116 pages.
Y. Bernet, et al., "An Informal Management Model for Diffserv Routers", Network Working Group, Request for Comments: 3290, May 2002, 56 pages.
K. Chan, et al., "Differentiated Services Quality of Service Policy Information Base," Network Working Group, Request for Comments: 3317, Mar. 2003, 96 pages.
B. Fenner and J. Flick, "Management Information Base for the User Datagram Protocol (UDP)", Network Working Group, Request for Comments: 4113, Jun. 2005, 19 pages.
S. Kent and K. Seo., "Security Architecture for the Internet Protocol", Network Working Group, Request for Comments: 4301, Dec. 2005, 101 pages.
R. Housley, "Using Advanced Encryption Standard (AES) CCM Mode with IPsec Encapsulating Security Payload (ESP)", Network Working Group, Request for Comments: 4309, Dec. 2005, 13 pages.
E. Rosen and Y. Rekhter, "BGP/MPLS IP Virtual Private Networks (VPNs)", Network Working Group, Request for Comments: 4364, Feb. 2006, 47 pages.
J. Babiarz, et al., "Configuration Guidelines for DiffServ Service Classes," Network Working Group, Request for Comments: 4594, Aug. 2006, 57 pages.
K. Kompella and Y. Rekhter, "Virtual Private LAN Service (VPLS) Using BGP for Auto-Discovery and Signaling", Network Working Group, Request for Comments: 4761, Jan. 2007, 28 pages.
M. Lasserre and K. Kompella, "Virtual Private LAN Service (VPLS) Using Label Distribution Protocol (LDP) Signaling", Network Working Group, Request for Comments: 4762, Jan. 2007, 31 pages.
L. Eggert and G. Fairhurst, "Unicast UDP Usage Guidelines for Application Designers", Network Working Group, Request for Comments: 5405, Nov. 2008, 27 pages.
F. Baker, et al., "A Differentiated Services Code Point (DSCP) for Capacity-Admitted Traffic", Internet Engineering Task Force (IETF), Request for Comments: 5865, May 2010, 14 pages.
Mats Bjorkman, et al.; "Bandwidth Available in Real Time measurement Applications"; Ericsson AB, SICS AB; 2008; 6 pages.
K. Hedayat, et al.; "A Two-Way Active Measurement Protocol (TWAMP)"; Network Working Group; RFC 5357; Oct. 2008; 26 pages.
A. Morton, et al.; "Two-Way Active Measurement Protocol (TWAMP) Reflect Octets and Symmetrical Size Features"; Internet Engineering Task Force (IETF); RFC 6038; Oct. 2010; 18 pages.

* cited by examiner

HIGH-PRECISION PACKET TRAIN GENERATION

The present invention is generally related to packet processing in high-speed communications network equipment, and is more particularly related to the generation of high-precision packet trains in such equipment.

BACKGROUND

In fourth-generation (4G) Internet Protocol (IP) networks, as in any high-performance data network, measuring and monitoring parameters like latency, available bandwidth, jitter, etc., are of immense importance, since that which is not measured cannot be reliably controlled. In response to this need, several Requests for Comment (RFCs) related to network monitoring and measurement have recently emerged in the Internet Engineering Task Force (IETF), the largest international organization concerned with the evolution of the Internet. Examples include RFC 5357, titled "A Two-Way Active Measurement Protocol (TWAMP)," and RFC 6038, titled "Two-Way Active Measurement Protocol (TWAMP) Reflect Octets and Symmetrical Size Features."

For some measurements of network performance, there is a requirement of generating a precise packet train, to be used as a traffic pattern for non-intrusive IP network measurement. In particular, some advanced techniques for estimating the available bandwidth in an IP network path require the high-speed generation of a short packet train with precise inter-packet gaps, so that congestion can be generated on a very short time scale. Based on time stamping done at a packet train sender and a receiver, packet dispersion can be evaluated to determine exactly how the packet train is affected as it traverses the network. This packet dispersion can be evaluated in turn to determine the available bandwidth.

The generation of short packet trains with precise inter-packet gaps presents a number of challenges in practice, however. Several of these challenges arise from the architecture of the typical packet processing platform, which may include a control processor, running a non-real-time operating system, a packet/network processor circuit, specially designed to handle real-time processing of network traffic, and line interface cards, which provide hardware-based, high-speed functions such as fabric queuing, traffic shaping, and the like.

One challenge is that increasing port bandwidths necessitate even higher-performance packet generation and transmission techniques. This high performance is not likely to be available from a general-purpose control processing element or from the Operations, Administration and Maintenance (OAM) engine on a packet processor chip, for example, as these devices cannot provide the precise timing needed. If precise inter-packet gaps are not produced, the performance of bandwidth estimation algorithms will be adversely affected. Likewise, additional latency introduced by such devices will delay the measurement feedback, possibly leading to oscillations in control loops and/or to sub-optimal performance in one or more network zones. These problems will continue to get worse with higher-throughput interfaces.

Of course, specialized circuits could be developed for generating high-speed, high-precision packet trains. However, such circuits are likely to be costly, and this approach does not address the problem for existing platforms. Accordingly, techniques are needed for generating high-speed, high-precision packet trains in packet processing platforms having conventional architectures.

SUMMARY

Because of the low resolution of the operating system clock in the typical packet processing platform, a CPU-based technique is not suitable for producing a high-precision packet train. Similar problems arise when attempting to generate a packet train with an Operations, Administration, and Maintenance (OAM) processor. The situation becomes even more challenging as the network path bandwidths increase.

As described in detail below, these problems may be addressed using one of several methods disclosed herein for generating a high-precision packet train in a network node, for transmission through a data communications network. An example method includes configuring an initial packet generation flow in the network node, the initial packet generation flow having a duration T, and sending a packet to a loopback port to initiate the initial packet generation flow in the network node, where the loopback port loops packets back to the network node or recirculates packets within the network node, and where the loopback port is configured for traffic shaping that establishes a pre-determined inter-packet gap for packets output by the loopback port. The method further includes, at some point prior to expiration of the duration T, configuring a main packet generation flow in the network node, the main packet generation flow having a duration t1 that commences upon expiration of the duration T. Looped back packets in the network node are sent to the loopback port for the entirety of durations T and t1, while one copy of each looped back packet in the network node is sent to the data communications network, via a network port, only during the duration t1.

As explained in further detail below, configuring the initial packet generation flow and configuring the main packet generation flow may be performed using OpenFlow standard constructs, in some embodiments. Thus, for example, configuring the main packet generation flow comprises, in some embodiments, configuring an OpenFlow table with a Group entry specifying the main packet generation flow, and setting a priority for the main packet generation flow to be lower than a priority for the initial packet generation flow.

The loopback port, which in the method summarized above is configured for traffic shaping, can take one of several forms. For example, in some embodiments the loopback port comprises a port communicatively connected to a traffic-shaping queue. In embodiments where the network node implements the OpenFlow standard, the traffic-shaping queue may be configured outside the OpenFlow domain, in some embodiments. In other embodiments where the network node implements the OpenFlow standard, the traffic-shaping queue may be configured, according to the OpenFlow standard, to have a MINIMUM RATE equal to a MAXIMUM RATE, such that the predetermined inter-packet gap is based on the MINIMUM RATE and MAXIMUM RATE.

In some embodiments, the loopback port comprises an external loopback path between two physical ports of the network node. In other embodiments, the loopback port may instead comprise a loopback path that is internal to the network node.

In some embodiments, the methods summarized above may include incrementing a source port parameter in the copy of each looped back packet sent to the data communications network, via the network port. This aids the node performing the measurements in evaluating the network's performance. In some embodiments, where the network node implements the OpenFlow standard, this incrementing of the source port parameters may be done by configuring the main packet generation using an OpenFlow table with N Group entries, each of the N Group entries being configured to be valid only during the duration t1, where N is the number of packets to be sent to the data communications network during the duration t1. Each of the N Group entries in the table includes (i) OXM match criteria for a different source port, the source ports corresponding to the N Group entries ranging from P to P+N−1, and (ii) an action to set a source port, in response to a match, to the source port matching value for the Group entry plus one. With this approach, each looped back packet triggers a new packet with an incremented source port parameter.

In the methods summarized above, the inter-packet gap is driven by the traffic-shaping operation of the loopback port. In a variant of these methods, the loopback rate is not strictly regulated, but instead a traffic-shaping network port sets the inter-packet gap as the packets are sent into the data communications network. An example method according to this approach comprises configuring an initial packet generation flow in the network node, the initial packet generation flow having a duration T. The method further comprises sending a packet to a loopback port to initiate the initial packet generation flow in the network node, where the loopback port loops packets back to the network node or recirculates packets within the network node. This loopback port need not have a traffic-shaping function. The method further includes, at some point prior to expiration of the duration T, configuring a main packet generation flow in the network node, the main packet generation flow having a duration t1 that commences upon expiration of the duration T. Looped back packets in the network node are sent to the loopback port for the entirety of durations T and t1, while copies of looped back packets in the network node are sent to the data communications network, via a traffic-shaping network port, only during the duration t1. The traffic-shaping network port is configured to establish a pre-determined inter-packet gap for packets output by the traffic-shaping network port.

As was the case with the other methods summarized above, in some embodiments, configuring the initial packet generation flow and configuring the main packet generation flow are performed using OpenFlow standard constructs. Thus, for example, configuring the main packet generation flow may comprise configuring an OpenFlow table with a Group entry specifying the main packet generation flow, and setting a priority for the main packet generation flow to be lower than a priority for the initial packet generation flow.

In some embodiments, the traffic-shaping network port comprises a network port attached to a traffic-shaping queue. In some embodiments where the network node implements the OpenFlow standard, the traffic-shaping queue may be configured outside the OpenFlow domain. In others, the traffic-shaping queue is configured, according to the OpenFlow standard, to have a MINIMUM RATE equal to a MAXIMUM RATE, where the predetermined inter-packet gap is based on the MINIMUM RATE and MAXIMUM RATE.

In some embodiments, the loopback port comprises an external loopback path between two physical ports of the network node. In others, the loopback port comprises a loopback path that is internal to the network node.

As with the other methods summarized above, the methods utilizing a traffic-shaping network port may comprise incrementing a source port parameter in each of the packets directed to the data communications network, via the traffic-shaping network port. Once again, this may be done, for example, by configuring the main packet generation flow in the network node by configuring an OpenFlow table with N Group entries, each of the N group entries being configured to be valid only during the duration t1, where N is the number of packets to be directed to the data communications network during the duration t1. Each of the N Group entries (i) includes an OXM match criteria for a different source port, the source ports corresponding to the N Group entries ranging from P to P+N−1, and (ii) has an action to set the source port, in response to a match, to the source port matching value for the Group entry plus one.

Other embodiments of the invention include systems configured to carry out one or more of the methods summarized above and/or variants thereof. For example, an example system includes a controller, such as a Software-Defined Networking (SDN) controller, configured to configure an initial packet generation flow in a packet-processing node, the initial packet generation flow having a duration T, and to configure a main packet generation flow in the packet-processing node, during the duration T, the main packet generation flow having a duration t1 that commences upon expiration of the duration T. The system further includes the packet-processing node, which is configured to respond to the configuring of the initial packet generation flow and main packet generation flow by: (i) sending a packet to a loopback port to initiate the initial packet generation flow, where the loopback port is configured for traffic shaping and where said traffic shaping establishes a pre-determined inter-packet gap for packets output by the loopback port, (ii) directing looped back packets to the loopback port for the entirety of durations T and t1, and (iii) sending one copy of each looped back packet to the data communications network, via a network port, only during the duration t1.

In a variant of the above-summarized system, the packet-processing node is configured to respond to the configuring of the initial packet generation flow and main packet generation flow by: (i) sending a packet to a loopback port to initiate the initial packet generation flow in the network node, wherein the loopback port loops packets back to the packet-processing node or recirculates packets within the packet-processing node, (ii) sending looped back packets in the packet-processing node to the loopback port for the entirety of durations T and t1, and (iii) sending copies of looped back packets in the packet-processing node to the data communications network, via a traffic-shaping network port, only during the duration t1, wherein the traffic-shaping network port is configured to establish a pre-determined inter-packet gap for packets output by the traffic-shaping network port. The several variants and details of the methods summarized above are equally applicable to the corresponding systems.

This disclosure thus describes a generic method to solve the problem of precise packet train generation on a packet processing platform, which method can be implemented on many packet processing platforms, including platforms designed for compliance with the OpenFlow standards. Example embodiments of the methods and apparatus summarized above are described in detail below. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
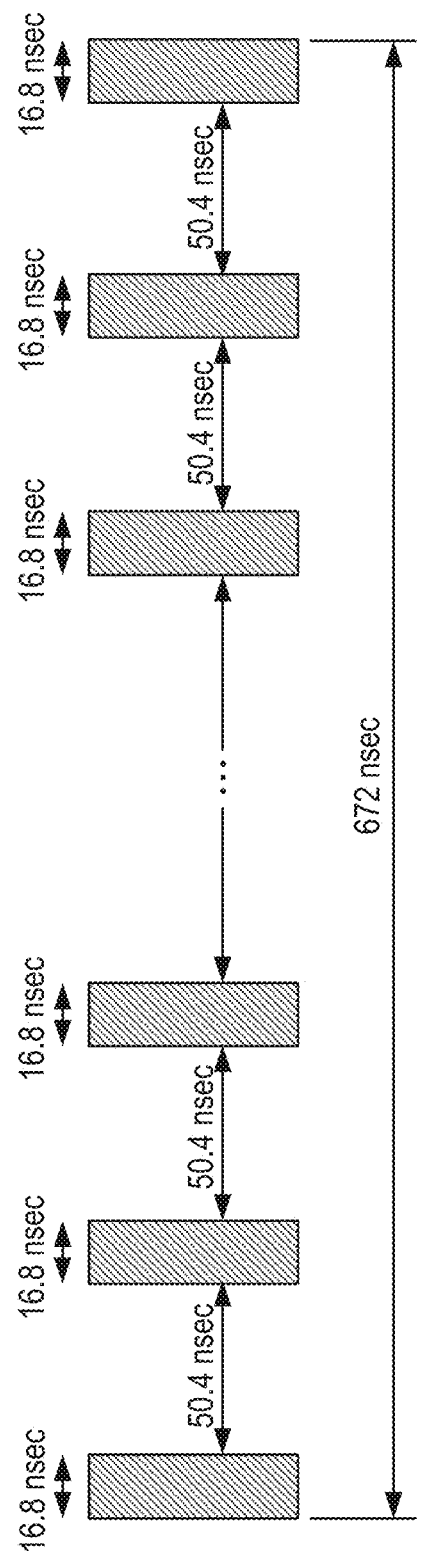
FIG. 1 illustrates a high-precision packet train suitable for network monitoring in a high-speed packet communications network.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application-specific integrated circuits (ASICs), programmable logic arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors (e.g., microprocessors, microcontrollers, and the like), and the terms computer and processor may be employed interchangeably. When provided by a computer or processor, the functions may be provided by a single dedicated computer or processor, by a single shared computer or processor, or by a plurality of individual computers or processors, some of which may be shared or distributed. Moreover, the term "processor" also refers to other hardware capable of performing such functions and/or executing software, such as the example hardware recited above.

In high-speed packet data networks, some performance measurement techniques may require the generation of a very precise packet train to be used as the traffic pattern for non-intrusive IP network measurements. These measurements can be used to estimate the available bandwidth in an IP network path, for example. Other techniques use a packet-pair probe-based method where two consecutive packets are injected at a sender node and analyzed at a receiver node; based on the distortion of the packet gap, some predictions of network performance can be made.

Using conventional OpenFlow methods in Software Defined Networking (SDN) networks, these kinds of packet measurement and bandwidth estimation processes are not possible. In particular, SDN controller-based measurements are of no use at all.

More particularly, some advanced network performance measurement techniques require the generation of a short packet train with a very precise inter-packet gap, so that congestion can be generated on a very short time scale. Based on time stamping done at sender and receiver nodes, packet dispersion in the network is analyzed; the results of this analysis can then be used to estimate the available bandwidth between the sender and receiver nodes.

In a policy-controlled OpenFlow SDN network, there will be intense interest to implement these techniques. In some network configurations, for example, multiple OpenFlow switches are distributed across different locations and then interconnected through an Internal Transport Fabric overlaid on a standard L2/L3 network. This gives a notion of one big switch/router for seamless network services like emulated LAN (ELAN), Service Chaining, etc. In this use case, these advanced network performance measurement techniques can be used for accessing the bandwidth across the internal transport tunnel and protecting the Service-Level Agreements (SLAs) of the user flows.

Hence, an SDN controller-based technique for high-precision packet train generation in the context of an OpenFlow SDN network is needed.

As suggested above, a general-purpose Central Processing Unit (CPU) is not able to generate the high-performance packet trains needed to support advanced network measurement and monitoring techniques. When a packet is generated from a CPU, data transfer works across two different clock domains—an operating system clock domain and a network clock domain. The operating system clock, which is basically the timer interrupt, might be on the order of 10 milliseconds, for example. This clock works as a heartbeat for the operating system, but is not suitable for high-precision timing tasks. Increasing the speed, i.e., granularity, of the operating system clock would improve the resolution of the timer interrupts, but the processor would then spend much more of its time in kernel mode, executing the operating system code. This would decrease the user-level computation utilization for the processor.

On the other hand, the network clock in this context is packet-size mapped to the time domain, for a certain link speed. An example high-speed link might operate at 10 Gigabits-per-second (10G), for example. Assume that smaller size packets on a 10G link consume 84 bytes, e.g., a 64-byte payload, plus a 12-byte inter-frame gap (IFG), plus an 8-byte preamble. These 84 bytes take 67.2 nanosecond (nsec) to transmit on a 10G link, at 0.1 nsec/bit. Thus, the network clock in this context must accommodate network processing at intervals on the order of 67.2 nsec, which is orders of magnitude smaller than the typical operating system clock period.

Because of the low resolution of the operating system clock, a CPU-based technique is not suitable for producing a high-precision packet train. With the CPU-based approach, a packet train generation application will load the transfer buffer, after which the entire buffer is emptied out on the wire at once to create the burst. Because the time period of the operating system clock is much higher than the network clock, as discussed above, it is quite obvious that a poorly controlled burst of packets may be generated for a given connection.

Similar problems arise when attempting to generate a packet train with an OAM processor. The situation becomes even more challenging as the network path bandwidths increase. Further, the OAM processor is also tasked with other important tasks like operating a high-resolution Bidirectional Forwarding Detection (BFD) session or carrying out 3.3-millisecond 802.1ag Connectivity Fault Management/Continuity Check Message (CFM/CCM) operations.

Thus, CPU-based or OAM processor-based techniques are not able to meet the strict requirements for generating a packet train with precise inter-packet gap for high-speed network monitoring. For example, the scenario introduced earlier requires the generation of short-term congestion at 10G on a 40G Ethernet port for 672 nanoseconds (nsec). The packet train characteristics for this scenario can be derived as follows:

Assume the packet is 64 bytes in length;
Add a preamble and Start Frame Delimiter (SFD) of 8 bytes and inter-frame gap (IFG) of 12 bytes;
Total bytes on wire=8 (preamble & SFD)+64 (actual packet)+12 (IFG)=84 bytes;
84 bytes*8 bits/byte=672 bits;
At 40G, each bit is 0.025 nsec; hence, the duration of transmission unit on wire in the time domain is 672 bits*0.025 nsec=16.8 nsec;
To create short-term congestion for 672 nsec, ten packets (672 nsec/4*16.8 nsec/packet=10) are sent, with a precise period of 67.2 nsec. Given a packet time of 16.8 nsec, this yields an inter-packet gap of 50.4 nsec.

This example packet train is illustrated in FIG. 1.

Embodiments of the present invention provide for high-precision packet train generation and can be applied in OpenFlow Software Defined Networking (SDN) networks without changing the OpenFlow standards (e.g., as specified in version 1.3.3 of the "OpenFlow Switch Specification" published by the Open Networking Foundation and available at https://www.opennetworking.org/images/stories/downloads/sdn-resources/onf-specifications/openflow/openflow-spec-v1.3.3.pdf). These embodiments are suitable for any whitebox or standard OpenFlow switch.

The methods described herein can be used for estimating the available bandwidth in between two nodes in a data communication network and, more particularly, between two nodes in an OpenFlow SDN network. The disclosed techniques can be used in any of a variety of advanced IP network performance management (IPPM) methods and even as SDN node stress testing aids, since the disclosed methods facilitate originating packets at line rate.

Although the packet generation techniques described herein do not mandate any changes in the OpenFlow specifications, it will be appreciated that any IPPM algorithm that requires time stamping of packet departure and arrival will need minor enhancements to the OpenFlow specifications (as of version 1.3.3), as time stamping is not yet an OpenFlow feature. An enhancement may be made, for example, with respect to recording the time of arrival of each packet and reporting it to the SDN controller in the PACKET_IN message.

The techniques described herein include methods for high-precision packet train generation in a data communication network, such as an OpenFlow SDN network, which methods are capable of creating short-term congestion at a high bandwidth port (e.g., a 40-gigabit-per-second port) or in a given network path, as may be required by an advanced IPPM method. Embodiments of these techniques address one or more of the following problems:

A high-performance packet transmission method providing very precise inter-packet gaps is needed, e.g., for use in an advanced IPPM method.

The gap between the packets in a train must be very precise, as performance evaluation algorithms may otherwise fail to converge properly.

The precision required for inter-packet gaps becomes more difficult to provide with high-throughput interfaces. This is because the higher the throughput of the interface, the lower the required inter-packet gap. For example, for 40 gigabit interfaces, the inter-packet gap may be on the order of 50 nanoseconds, as shown in FIG. 1.

Conventionally, specialized hardware is required to generate packet trains with such low and accurate inter-packet gaps. Such hardware is expensive and may not be available in the field where network performance analysis has to be performed in real time. Hence, it would be desirable to generate such packet trains from regular network elements such as switches/routers. However, such high precision cannot be maintained by software based packet generators running in control-plane processor elements in switches/routers. Conventional switch/router forwarding plane elements perform high-precision packet forwarding, but are not specialized for high precision packet train generation.

For the reasons given above, it is clear that an SDN controller-based approach to generating a high-precision packet train will not suffice. The techniques described herein instead use an approach in which the SDN controller is not participating in real-time data-plane operation, but is working as a policy enforcer.

The techniques described herein may be used to provide precise packet train generation on an OpenFlow SDN packet processing platform, such as an EFS/OPENFLOW SWITCH or any whitebox. Some of the techniques described herein may be summarized as follows:

An SDN Controller configures a traffic-shaper/OpenFlow queue with MAX BANDWIDTH and MIN BANDWIDTH equal and set to a value that provides the inter-packet gap requirement of the packet train.

The SDN Controller generates a packet (only one packet to start the process) and inserts that packet in a packet processing pipe line.

A sender-side OpenFlow data plane node configured as described below can continue to re-circulate the packet. At precise moments, the sender-side OpenFlow data plane node sends copies of the packet to the network as well. A receiver-side OpenFlow data plane node records the packet arrival time and sends the packet towards the SDN controller. The PACKET_IN message to the SDN controller will have a packet arrival timestamp.

The SDN controller knows the precise packet gap at the sender end, because the SDN controller configured the shaper parameters that control the packet gap.

From the receiver end, the SDN controller receives the packet arrival timestamps and can then run its filter algorithm for bandwidth estimation.

According to some embodiments of the techniques detailed here, one or more of the following OpenFlow standard constructs are used:

PACKET_OUT
PACKET_IN
Group Entry to broadcast the packet
FLOW HARD TIMEOUT
FLOW COOKIES
FLOW EXPIRE/REMOVAL MESSAGE It will be appreciated, however, that the techniques described herein are not limited to implementation on OpenFlow platforms, using OpenFlow constructs, or using the above particular OpenFlow constructs.

Figure 2:
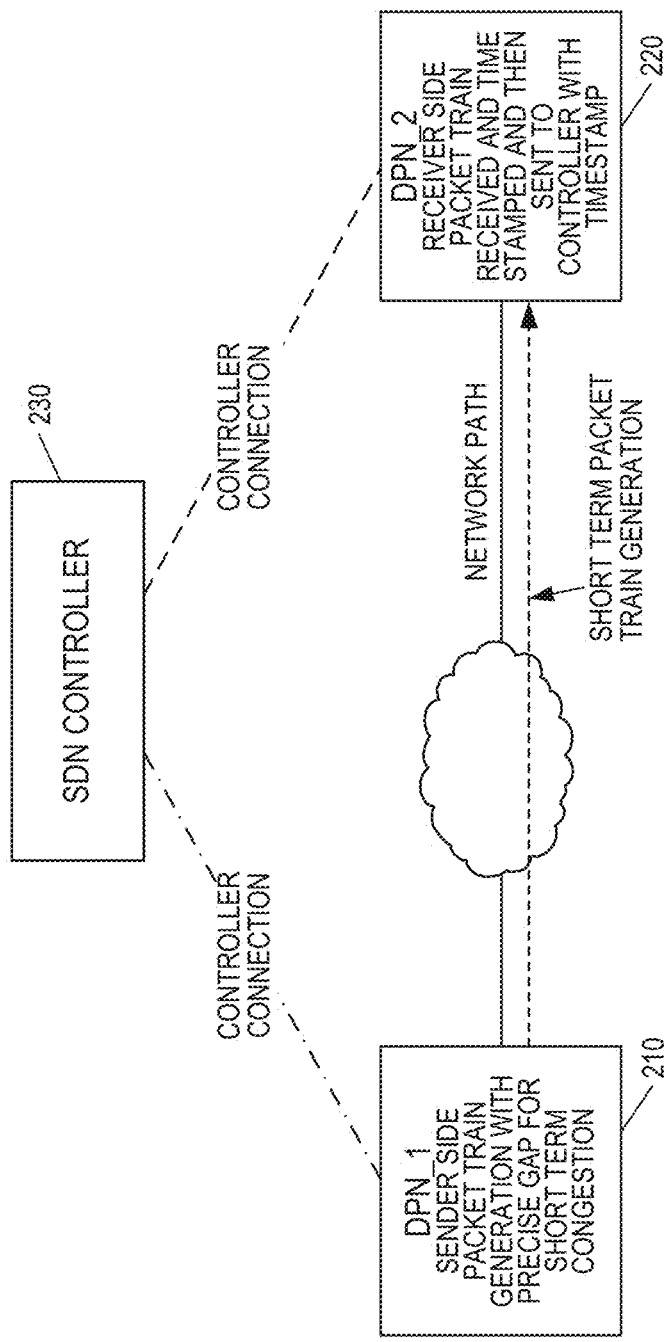
FIG. 2 illustrates a Software Defined Networking (SDN) bandwidth estimation process.

FIG. 2 illustrates the SDN network components used for bandwidth estimation. These components include a sender-side node 210, which generates a high-precision packet train with a precise inter-packet gap, for short-term congestion, using any of the techniques described herein. At the other end of a network path, a receiver-side node 220 receives the packet train and time stamps the received packets before sending them to an SDN controller 230. The SDN controller 230 is responsible for configuring the sender-side node 210 to generate the packet train, and thus knows the inter-packet gap. Using this information and the timestamps received from the receiver-side node 220, the SDN controller 230 can run any of a variety of IPPM algorithms, including algorithms for estimating available bandwidth between the sender-side node 210 and the receiver-side node 220.

Figure 3:
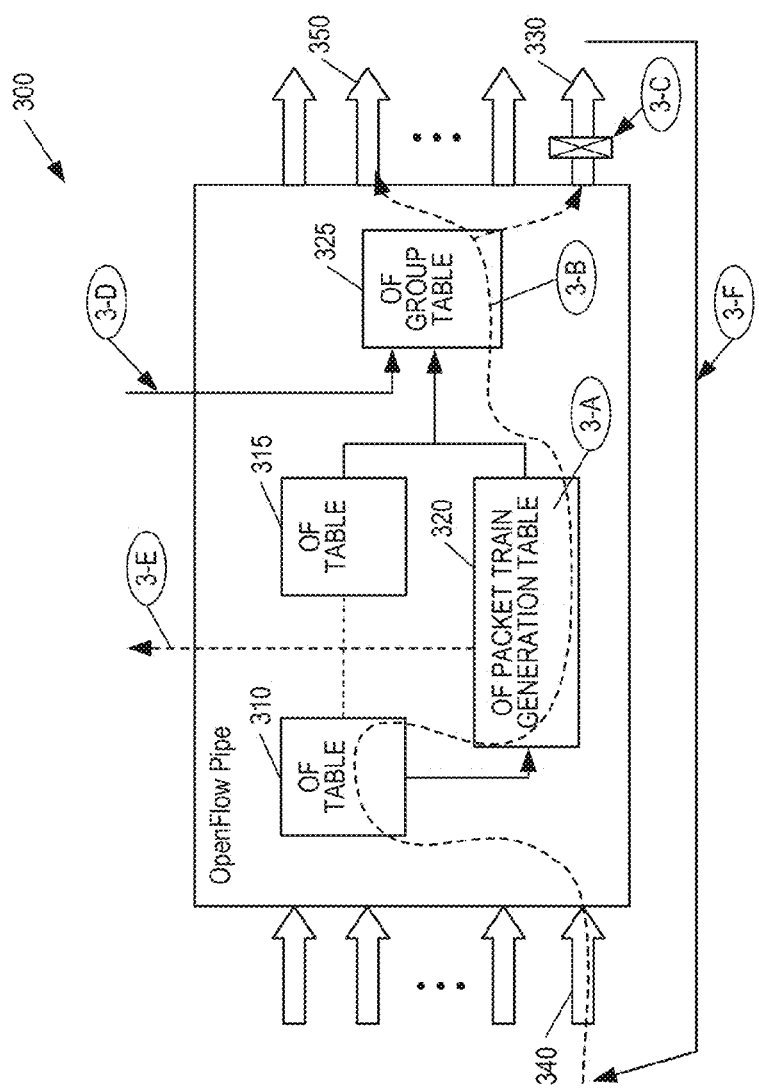
FIG. 3 is a block diagram illustrating sender-side logic according to one approach for generating high-precision packet trains.

Sender-side node 210 may use one of several alternatives for generating a measurement traffic stream comprising a high-precision packet train. In one alternative, sender-side node 210 generates the train with a packet loop mechanism and a traffic-shaper or OpenFlow queue positioned in the loopback path. This is illustrated in FIG. 3, which shows an OpenFlow pipe 300 in a sender-side node. Incoming ports are shown on the left-hand side, while outgoing ports are shown on the right-hand side.

The illustrated OpenFlow pipe 300 includes OpenFlow tables 310, 315, 320, and 325 (the latter of which is a Group table), which are configured for the packet train generation by the SDN controller 230, as will be explained in further detail below. As shown at 3-A, a packet is generated, under the direction of SDN controller 230. This packet is processed according to OpenFlow Group table 325, as shown at 3-B. For an initial period (configured by the SDN controller 230) as shown at 3-C, the packet is sent only to loopback port 330, which is configured to provide a traffic-shaping function so as to regulate the inter-packet gap for looped back packets. As shown at 3-F, the packets sent to loopback port 330 are looped back to an input port 340, for recirculation. This process is repeated for the duration of the initial period, which is established to provide an initialization period, during which the SDN controller 230 discontinues any involvement in real-time processing at the sender-side node 210. The SDN controller 230 may also perform any required configuration of the receiver-side node 220 during this initialization period, in some embodiments.

For a second period, which is also configured by the SDN controller 230 and which starts at the expiration of the initial period, one or more entries in the OpenFlow Group table 325 cause two actions to be performed with respect to looped back packets. First, a copy of each looped back packet continues to be sent to the loopback port 330 for recirculation. Second, a copy of each looped back packet is forwarded to network port 350, to be sent to the receiver-side node 220. It will be appreciated that because the inter-packet gap between looped back packets is regulated by the traffic-shaping function in the loopback path, the packet copies sent to the network port 350 for forwarding to the receiver-side node 220 will have the same tightly regulated packet spacing.

Further details of the operations shown in FIG. 3 are provided below, with reference to the numbered operations in FIG. 3.

First, as shown at 3-A, an OpenFlow TABLE-X (PRECISE_PACKET_TRAIN_GENERATION_TABLE) is configured with a flow entry to classify the packet train flow and send it to a Group entry. Initially, the table is configured with two flows with the following respective actions, based on a scenario in which the train is to be generated for a duration t1:

FLOW_Initial—This flow is used only initially, and not for the train generation itself. It sets the initial stage. It classifies the packet generation flow and sends a packet to the shaper/OF QUEUE in the loopback path, after which the packet is looped back. (Several loopback techniques are discussed below.) This flow expires after T seconds. This initial period is needed so that the SDN controller gets enough time to configure FLOW_Train, as discussed below. Essentially, expiry timer T provides a breathing time for the SDN controller to configure end-to-end flows, which might include configuring flows on the receiver-side node 220.

FLOW_Train—This is the main flow involved in packet train generation. It classifies the packet train flow and makes two copies of the packet. One copy is sent to the network, for forwarding to the receiver-side node 220. Another copy is sent to the traffic-shaper/OF QUEUE in the loopback path, so that the packet is looped back into the system. The FLOW_Train expires after T+t1 seconds. Note that this entry will only be invoked when FLOW_Initial is expired. Thus, FLOW_Train is covered for time T by FLOW_Initial and will be used after time T and will direct the flow towards the destination for an interval of t1. Hence, time t1 is the duration of the packet train. Thus, FLOW_Initial continues the packet re-circulation, until the SDN controller configures FLOW_Train and discontinues real time action. After T, FLOW_Train continues the re-circulation but also sends copies of the recirculated packets to the network.

This flow table is configured with the following information:

FLOW COOKIES—these may be used, in some embodiments, to identify the measurement session. In the event that something goes wrong (e.g., one of the packets becomes corrupted) in the packet generation at the sender side, the OpenFlow data plane node sends the Flow Expire message with a COOKIE ID. This way, the sender can abort and inform the SDN controller about the problem instead of continuing with the packet train generation. The cookie may be allocated by the SDN controller 230 at the time of setting up the OF TABLE-X.

Flow information to classify the packet train flow for bandwidth estimation.

A HARD TIMEOUT is provided with the flow information.

As shown in FIG. 3 at 3-B, a Group entry is invoked based on the classification in the OF Packet Train Generation Table 320. This Group entry replicates/sends the packet to the network port 350 and sends the packet out of the port. At the same time, this Group entry also sends one copy of the packet to loopback port 330. Before this replicated packet is received at the input port 340, the packet passes through a shaper. This shaper is configured as per the requirements of the measurement process being performed by the SDN controller 230. This shaper acts as a delay element in the loopback path, to ensure a precise inter-packet gap. After passing through the shaper, the packet is re-inserted in the OpenFlow pipeline, via the input port 340.

Thus, as shown at 3-C, a traffic-shaping function in the loopback path acts as a delay element and is configured to provide the desired inter-packet gap. This traffic-shaping function may be provided in several different ways. For example, in some embodiments, the shaper is attached to a queue that is configured outside of the OpenFlow domain and attached to a loopback port (either internal or external to the OpenFlow pipe). In other embodiments, the OpenFlow specifications may be extended so as to allow for an OpenFlow-based message that is used to configure a traffic shaper attached to the loopback port 330. In still other embodiments, the OpenFlow switch has a queue and this queue can be configured with a MAXIMUM rate and a MINIMUM rate. This queue can be configured using standard OpenFlow messages for queue configuration, with the MAXIMUM RATE being set equal to the MINIMUM RATE. This rate can be selected as per the required interval between two packets in the desired packet train. As per OpenFlow specifications, the queue length in bytes can also be configured so as to ensure that adequate buffering for the queue is provided. With an appropriately set queue length, a re-circulating packet will always find a place in the queue to be admitted and to wait for an appropriate time until forwarding, since the packet is scheduled as per allocated bandwidth for the queue. In this case, the queue is working like a delay element and may not need any extensions of the OpenFlow specifications.

As seen in FIG. 3, the loopback port 330 sends the packet back to an input port 340 in the OpenFlow pipe. There are several options for implementing the loopback ports. In some embodiments, the loopback is an external loopback across two physical ports. This can be transparent to OpenFlow. In other embodiments, the loopback path may comprise an internal loopback path, either via a special port or via a physical port that can be set in internal loopback mode. Another option is a simple software extension at the agent or switch local firmware, where a local port is emulated as a loopback port. In this case, the re-circulating packet is sent with special encapsulation, where local software detects that this is a re-circulating packet and hence inserts the packet back into the OpenFlow pipeline. In some embodiments, this might be done with a configurable delay, in which case a traffic shaper as a delay element may not be needed.

As shown in FIG. 3 at 3-D, using a PACKET_OUT message, a first IPPM message is sent to the sender-side node 210 to start the process of periodic transmission of IPPM packets. Here, a first packet is inserted by the SDN controller 230, and the first packet will be directly sent to the Group entry, which in turn sends one copy towards the network and another copy to loopback port 330. After this, the SDN controller 230 discontinues data path operations and only intervenes if there is any fault declared in the data path. It is to be noted that the first packet is directly inserted by the SDN controller 230 using the PACKET_OUT message, whereas following (i.e., loopback) packets are received at the input port 340 and traverse the packet pipeline.

As the packet is re-circulating around the OF pipe at the periodic interval, the packet continues to be classified by the OF TABLE-X, until a Flow Expire Message is generated from the PRECISE_PACKET_TRAIN_GENERATION_T-ABLE, as shown in FIG. 3 at 3-E. FIG. 3 at 300-6 indicates the packet re-circulation path, which is utilized until the Flow Expire Message is generated. The packets recirculated from the loopback port 330 will be classified through OF TABLE-X and then redirected to a Group entry for replication to the network port 350 and also to loopback port 330, to continue this re-circulation path.

Figure 4:
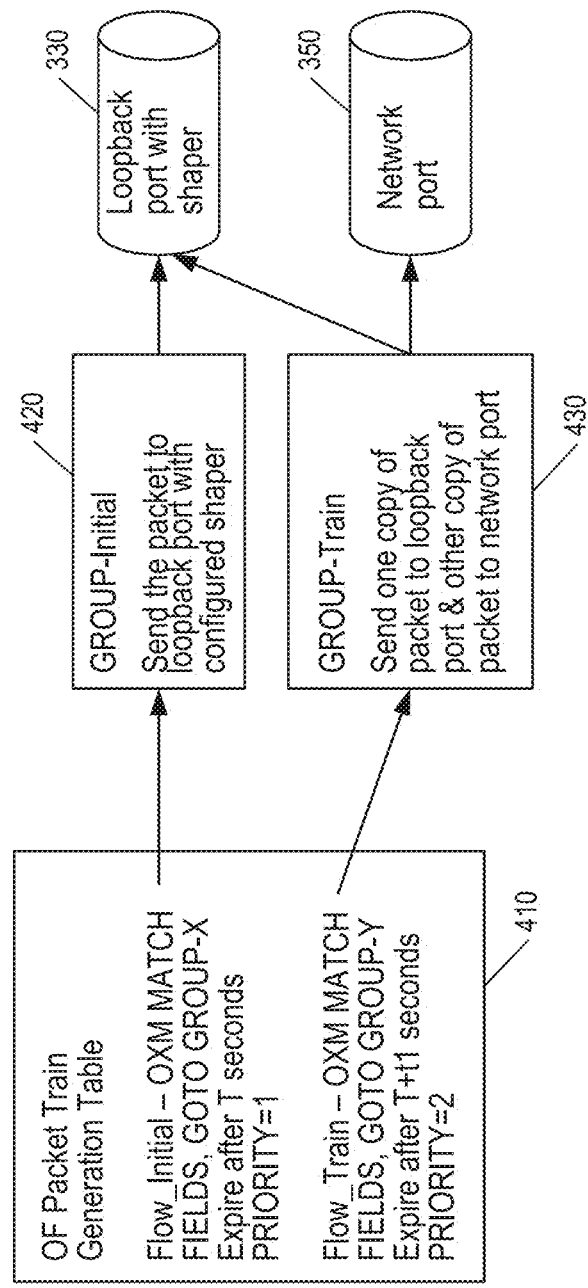
FIG. 4 illustrates a first alternative approach to the sender-side operations for generating a high-precision packet train.

FIG. 4 illustrates the basic operations detailed above. Block 410 illustrates the OpenFlow Packet Train Generation Table, which specifies a FLOW_Initial, with associated actions, and a FLOW_Train, also with associated actions. As discussed above, the FLOW_Train does not begin until the FLOW_Initial expires. Blocks 420 and 430 illustrate the packet forwarding operations that occur during the initial flow and the subsequent packet train flow. In the former, packets are sent to the loopback port 330 with configured shaper. In the packet train flow, one copy of each packet is sent to the loopback port 330, while another is sent to the network port 350.

Figure 5:
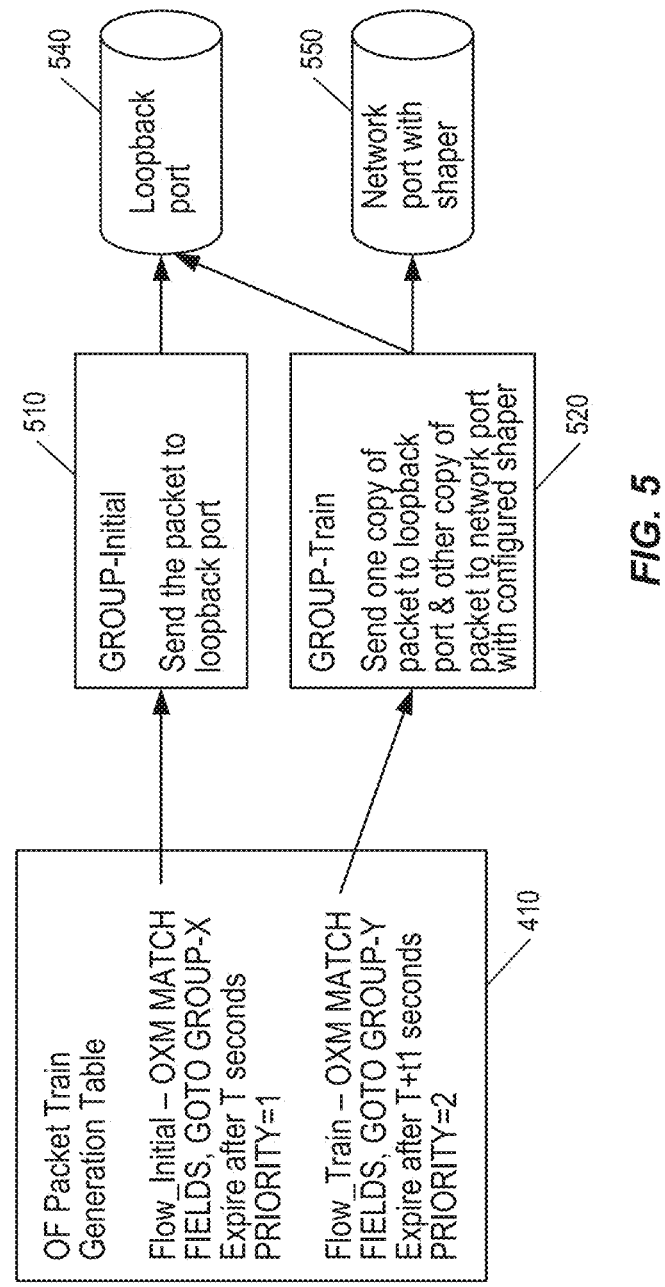
FIG. 5 illustrates a second alternative approach to the sender-side operations for generating a high-precision packet train.

In some circumstances, it may so happen that although a precise inter-packet delay is introduced by the shaper in the loopback path, the delay characteristics may be altered along the loopback path. This may introduce inaccuracies in the inter packet delay. Hence, it may be better, in some cases, to send the packet out into the network as soon as the packet exits a traffic shaper. FIG. 5 thus illustrates a variation of the sender-side configuration and operations shown in FIG. 4. This alternative approach differs from the approach illustrated in FIGS. 3 and 4 in that:

The shaper lies on the network egress path instead of the loopback path.

The looped back packet copy is not (or at least need not be) shaped.

These differences can be seen in FIG. 5 at blocks 510, 520, and at loopback port 540 and network port 550, the latter of which has a traffic-shaping function.

Figure 6:
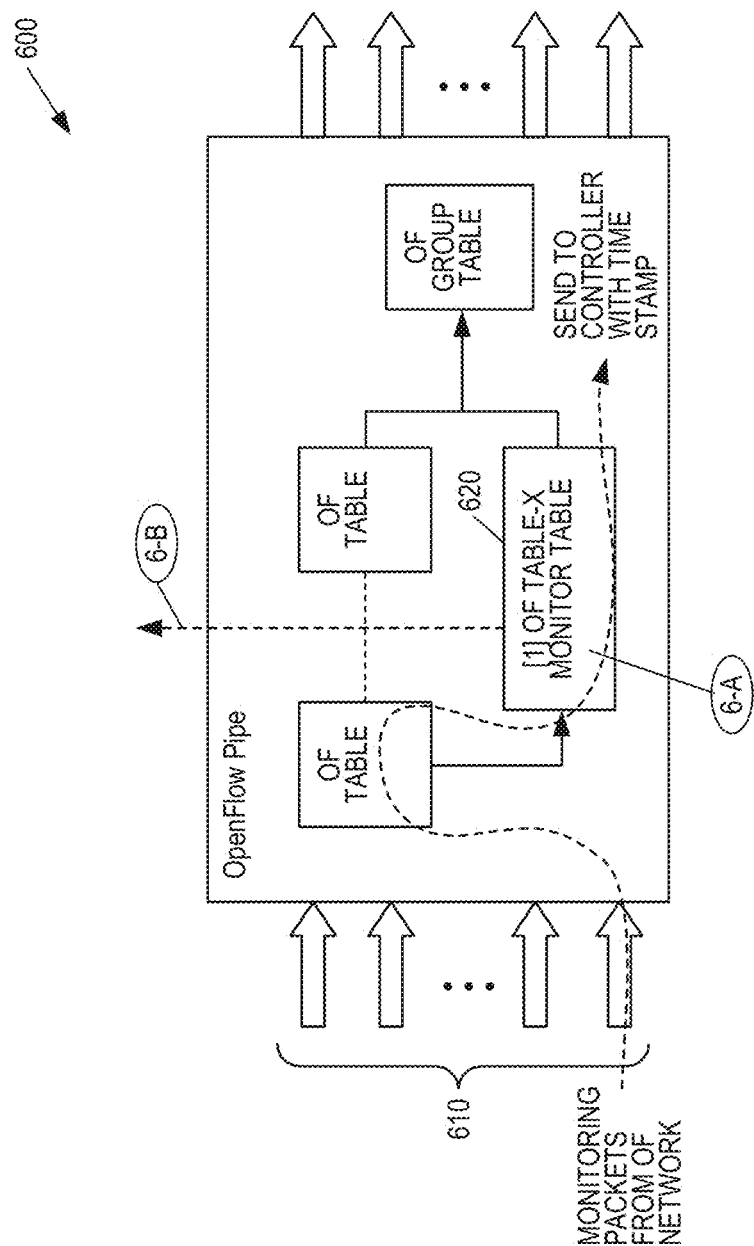
FIG. 6 is a block diagram illustrating receiver-side logic for receiving high-precision packet trains.

FIG. 6 illustrates an example implementation of the receiver-side logic, as implemented in an OpenFlow pipe 600 in a receiver-side node 220. The high-precision packet train generated by the sender-side node 210 is received at input ports 610. An OpenFlow Table-X 620 is configured with a classification record to identify the packet train, as shown at 6-A. Each flow is configured with a COOKIE ID and OXM match field, in some embodiments, which are used to classify the packet train flow. This COOKIE ID is allocated by the SDN controller 230 at the time the flow is configured, and is used by the SDN controller 230 to identify the path for which bandwidth is being estimated.

As the periodically generated packets are received by the receiver-side node 220, the flow is classified by a flow entry in OF Table-X. The packet can then be sent to the SDN controller 230 with a timestamp indicating the receipt time at the sender-side node 220, as indicated in FIG. 6 at 6-B. It is to be noted that only certain IPPM processes require the packet to be sent to the SDN controller 230 with PACKET_IN. The packets may have to be buffered on the receiver-side node, since the receiver-controller path may not be a fat pipe, unlike the data path from the sender. However, the congestion train length may be very short in these processes—for such a short length, the packet buffering does not demand much buffer size on the receiver-side node 220.

With the sender methods described above, the contents of every packet sent out are the same. This is a limitation with applications such as IPPM, where the receiver has to distinguish between packets, using some kind of packet ID, to accurately measure the inter-packet gap. The absence of such identifiers can render the measurement incorrect in the event of packet re-ordering.

In some embodiments of the presently disclosed techniques, the source port in the traditional five-tuple as the packet ID may be used for distinguishing packets within a train, as described in further detail below. According to these embodiments, the destination IP, source IP, and destination port fields, as well as the protocols field (UDP for IPPM), in the packet may remain the same across packets within a train. The SDN controller sets the source port in the first packet in the train that is sent to the receiver-side node (in PACKET_OUT) to be P. The source port is incremented for every subsequent packet sent to the receiver side node, until it reaches P+N−1, where N is the length of the train in number of packets.

Figure 7:
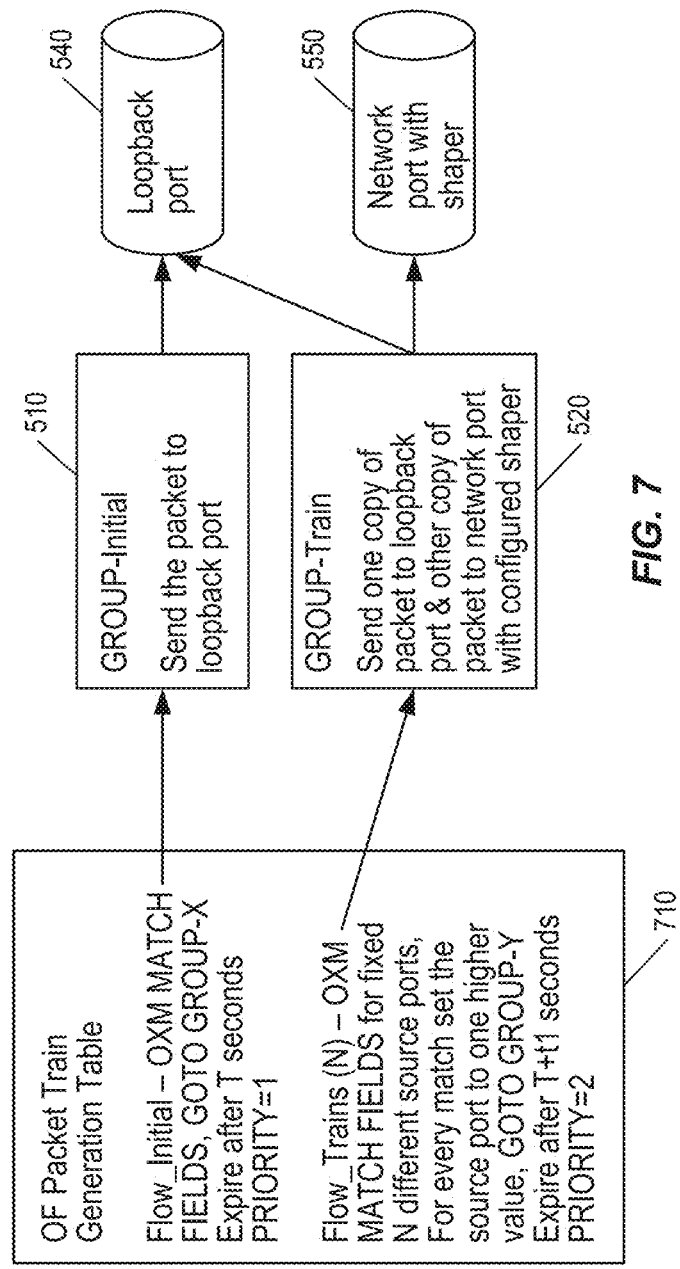
FIG. 7 illustrates details of an approach to providing source port incrementing in a high-speed packet train.

This solution can be accomplished using standard Open-Flow constructs, according to the following modifications to the techniques described above. These modifications are reflected in block 710 of FIG. 7, as well:

Instead of just one entry for FLOW_Train, N flows are configured, as seen in block 710 of FIG. 7.

Each of these N flow entries contains the OXM match criteria for different source ports, ranging from P to [P+N−1]. Matching to the source port can be in addition to other OXM match fields, but it is a must, for the purposes of this particular technique, that the source port is matched.

Each Group entry has a different port number as the match criteria, and the action for these matches is to set the source port number for the packet to a value one higher than the value found in the incoming packet (i.e., the source port number matching the next Group entry). For example, the i-th entry will match with P+i, and the action will be to set the source port number to P+i+1 for the next match. This will result in packets being generated with source ports P+1 to P+N. This action is in addition to sending the packet to GROUP-Train, as shown at block 520.

All of the entries in this table expire after time T+t1, too.

Since the train duration is typically small, the value N should be such that the flow entries can be accommodated in OpenFlow tables.

As an example, assume that the SDN controller 230 determines that the train length N is 10, and that the initial source port is 4000. The SDN controller 230 adds the source port match and actions as below:

Match: source port = 4000 → Action: Set port to 4001

Match: source port = 4001 → Action: Set port to 4002

...

...

Match: source port = 4009 → Action: Set port to 4010

With these flows, every packet with source port as P+i, for 0≤i≤(N−1) matches the source port OXM match rule for port P+i and the port is changed to P+i+1. In the next cycle, the packet matches the rule for source port P+i+1, and so on. Note that the receiver is also programmed with N flows, corresponding to N different source ports, instead of just one flow as described in the receiver side logic described earlier. With this approach, the SDN controller 230 can use the source port to distinguish between packets for IPPM calculations.

Figure 8:
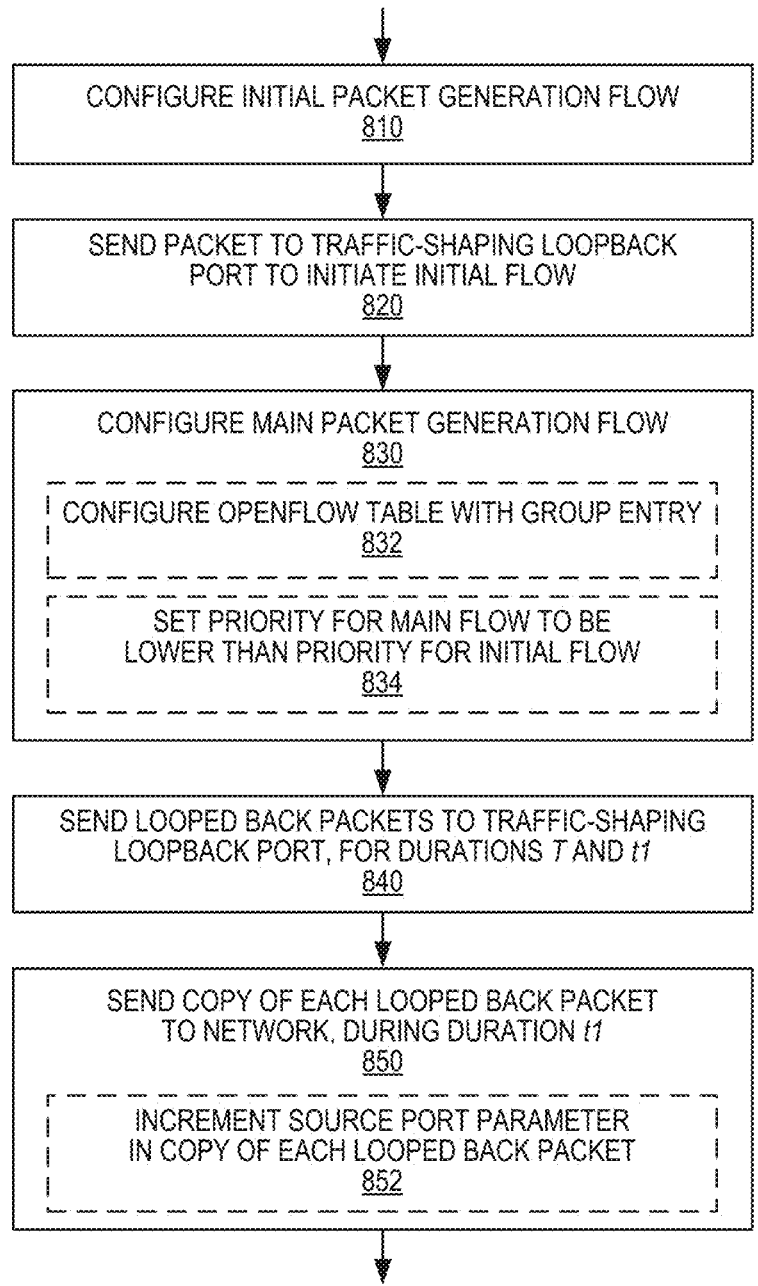
FIG. 8 is a process flow diagram illustrating an example method for generating a high-precision packet train.

With the preceding detailed examples in mind, it should be appreciated that the process flow diagram of FIG. 8 illustrates a generalized method for generating a high-precision packet train for transmission through a data communications network, according to several embodiments of the present invention. The illustrated method is suitable for implementation in a system that includes an SDN controller and another network node, such as a switch, where the SDN controller and network node may operate according to the OpenFlow specifications, in some embodiments.

As shown at block 810, the method illustrated in FIG. 8 includes configuring an initial packet generation flow in the network node. This initial packet generation flow has a duration T. The method further includes sending a packet to a loopback port to initiate the initial packet generation flow in the network node, as shown at block 820. In the illustrated method, the loopback port is configured to loop packets back to the network node or recirculate packets within the network node, and is configured for traffic shaping that establishes a pre-determined inter-packet gap for packets output by the loopback port. The method further includes, at some point prior to expiration of the duration T, configuring a main packet generation flow in the network node, the main packet generation flow having a duration t1 that commences upon expiration of the duration T. This is shown at block 830. It should be understood that the configuration operation shown in block 830 may be performed before performance of the operation shown in block 820, in some embodiments.

Looped back packets in the network node are sent to the loopback port for the entirety of durations T and t1, as shown at block 840. As shown at block 850, one copy of each looped back packet in the network node is also sent to the data communications network, via a network port, but only during the duration t1.

Configuring the initial packet generation flow and configuring the main packet generation flow may be performed using OpenFlow standard constructs, in some embodiments. Thus, for example, configuring the main packet generation flow comprises, in some embodiments, configuring an OpenFlow table with a Group entry specifying the main packet generation flow, as shown at block 832, and setting a priority for the main packet generation flow to be lower than a priority for the initial packet generation flow, as shown at block 834. These blocks are illustrated in FIG. 8 with dashed outlines, indicating that they may not be present in some instances or embodiments of the illustrated method.

The loopback port, which in the method shown in FIG. 8 is configured for traffic shaping, can take one of several forms. For example, in some embodiments the loopback port comprises a port communicatively connected to a traffic-shaping queue. In embodiments where the network node implements the OpenFlow standard, the traffic-shaping queue may be configured outside the OpenFlow domain, in some embodiments. In other embodiments where the network node implements the OpenFlow standard, the traffic-shaping queue may be configured, according to the OpenFlow standard, to have a MINIMUM RATE equal to a MAXIMUM RATE, such that the predetermined inter-packet gap is based on the MINIMUM RATE and MAXIMUM RATE.

In some embodiments, the loopback port comprises an external loopback path between two physical ports of the network node. In other embodiments, the loopback port may instead comprise a loopback path that is internal to the network node.

In some embodiments, the methods summarized above may include incrementing a source port parameter in the copy of each looped back packet sent to the data communications network, via the network port. This is shown in FIG. 8 at block 852. This approach aids the SDN controller in evaluating the network performance.

Figure 9:
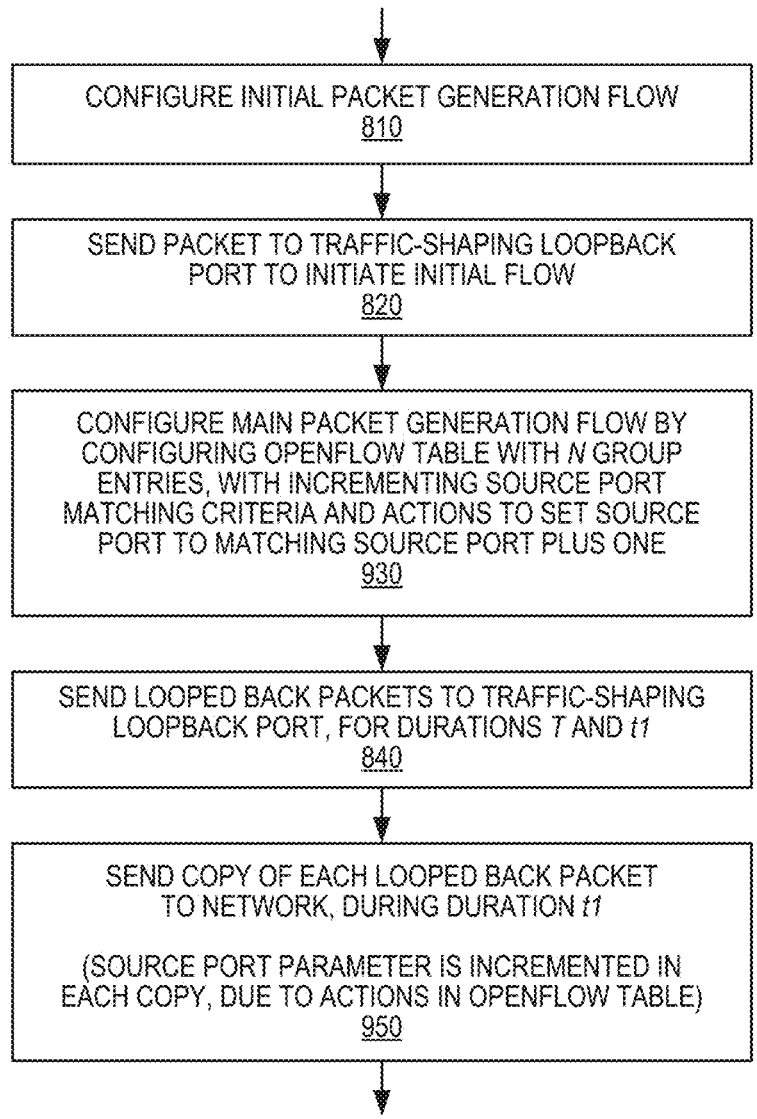
FIG. 9 is a process flow diagram illustrating a variant of the method shown in FIG. 8.

FIG. 9 illustrates a variant of the method shown in FIG. 8, where the source port parameter incrementing is performed using OpenFlow constructs. As shown at block 930, this incrementing of the source port parameters may be done by configuring the main packet generation using an OpenFlow table with N Group entries, each of the N Group entries being configured to be valid only during the duration t1, where N is the number of packets to be sent to the data communications network during the duration t1. Each of the N Group entries in the table includes (i) OXM match criteria for a different source port, the source ports corresponding to the N Group entries ranging from P to P+N−1, and (ii) an action to set a source port, in response to a match, to the source port matching value for the Group entry plus one. With this approach, each looped back packet during the packet train generation interval triggers a new packet with an incremented source port parameter, as indicated at block 950.

Figure 10:
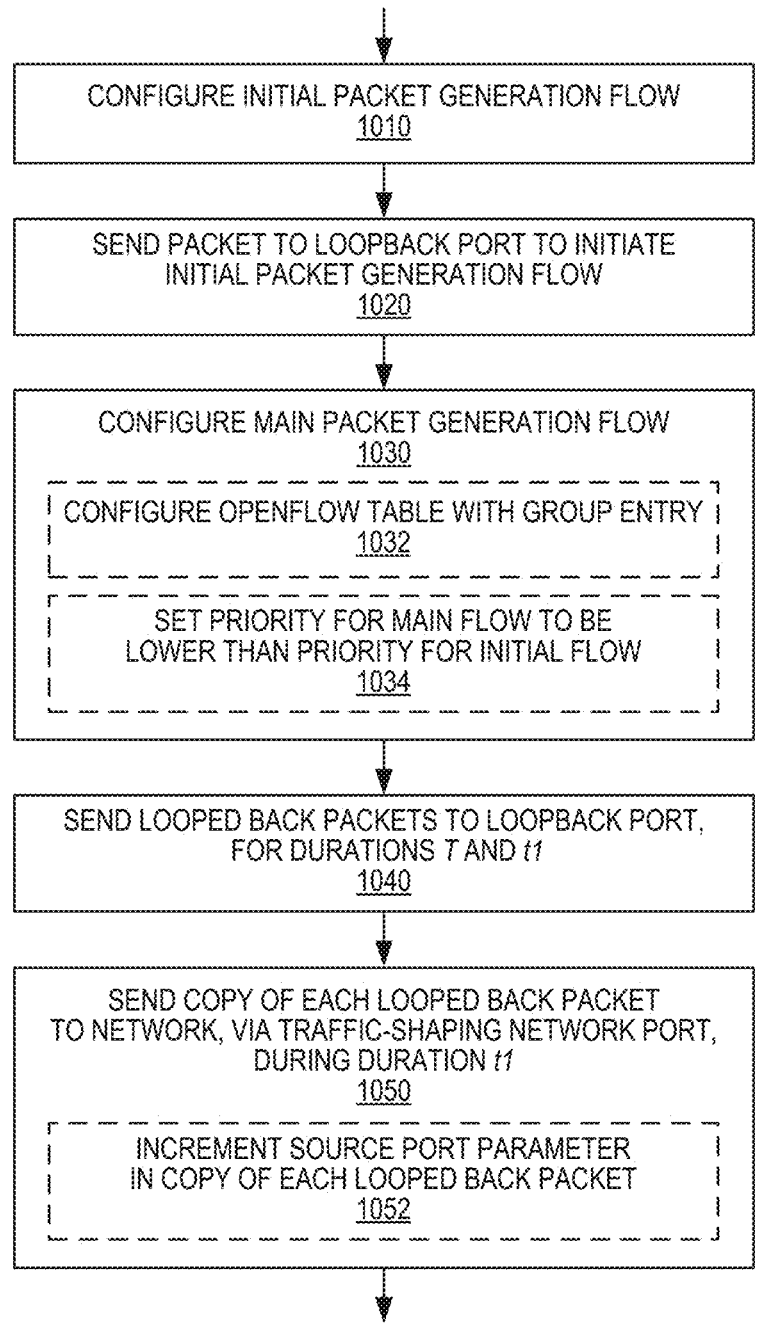
FIG. 10 is a process flow diagram illustrating another example method for generating a high-precision packet train.

In the methods summarized above, the inter-packet gap is driven by the traffic-shaping operation of the loopback port. In a variant of these methods, the loopback rate is not strictly regulated, but instead a traffic-shaping network port sets the inter-packet gap as the packets are sent into the data communications network. An example method according to this approach is shown in FIG. 10, and comprises, as shown at block 1010, configuring an initial packet generation flow in the network node, the initial packet generation flow having a duration T. The method further comprises sending a packet to a loopback port to initiate the initial packet generation flow in the network node, as shown at block 1020. The loopback port loops packets back to the network node or recirculates packets within the network node, but need not have a traffic-shaping function. The method further includes, at some point prior to expiration of the duration T, configuring a main packet generation flow in the network node, the main packet generation flow having a duration t1 that commences upon expiration of the duration T. This is shown at block 1030.

As shown at block 1040, looped back packets in the network node are sent to the loopback port for the entirety of durations T and t1. Copies of looped back packets in the network node are sent to the data communications network, via a traffic-shaping network port, only during the duration t1, as shown at block 1050. The traffic-shaping network port is configured to establish a pre-determined inter-packet gap for packets output by the traffic-shaping network port.

As was the case with the other methods summarized above, in some embodiments, configuring the initial packet generation flow and configuring the main packet generation flow are carried out using OpenFlow standard constructs. Thus, for example, configuring the main packet generation flow may comprise configuring an OpenFlow table with a Group entry specifying the main packet generation flow, as shown at block 1032, and setting a priority for the main packet generation flow to be lower than a priority for the initial packet generation flow, as shown at block 1034.

In some embodiments, the traffic-shaping network port comprises a network port attached to a traffic-shaping queue. In some embodiments where the network node implements the OpenFlow standard, the traffic-shaping queue may be configured outside the OpenFlow domain. In others, the traffic-shaping queue is configured, according to the OpenFlow standard, to have a MINIMUM RATE equal to a MAXIMUM RATE, where the predetermined inter-packet gap is based on the MINIMUM RATE and MAXIMUM RATE.

In some embodiments, the loopback port comprises an external loopback path between two physical ports of the network node. In others, the loopback port comprises a loopback path that is internal to the network node.

As with the other methods summarized above, the methods utilizing a traffic-shaping network port may comprise incrementing a source port parameter in each of the packets directed to the data communications network, via the traffic-shaping network port. This is shown at block 1052. Once again, this may be done, for example, by configuring the main packet generation flow in the network node by configuring an OpenFlow table with N Group entries, each of the N group entries being configured to be valid only during the duration t1, where N is the number of packets to be directed to the data communications network during the duration t1. Each of the N Group entries (i) includes an OXM match criteria for a different source port, the source ports corresponding to the N Group entries ranging from P to P+N−1, and (ii) has an action to set the source port, in response to a match, to the source port matching value for the Group entry plus one.

It will be appreciated that other embodiments of the invention include systems configured to carry out one or more of the methods summarized above and/or variants thereof. For example, an example system includes an SDN controller configured to configure an initial packet generation flow in a packet-processing node, the initial packet generation flow having a duration T, and to configure a main packet generation flow in the packet-processing node, during the duration T, the main packet generation flow having a duration t1 that commences upon expiration of the duration T. The system further includes the packet-processing node, which is configured to respond to the configuring of the initial packet generation flow and main packet generation flow by: (i) sending a packet to a loopback port to initiate the initial packet generation flow, where the loopback port is configured for traffic shaping and where said traffic shaping establishes a pre-determined inter-packet gap for packets output by the loopback port, (ii) directing looped back packets to the loopback port for the entirety of durations T and t1, and (iii) sending one copy of each looped back packet to the data communications network, via a network port, only during the duration t1.

In a variant of the above system, the packet-processing node is configured to respond to the configuring of the initial packet generation flow and main packet generation flow by: (i) sending a packet to a loopback port to initiate the initial packet generation flow in the network node, wherein the loopback port loops packets back to the packet-processing node or recirculates packets within the packet-processing node, (ii) sending looped back packets in the packet-processing node to the loopback port for the entirety of durations T and t1, and (iii) sending copies of looped back packets in the packet-processing node to the data communications network, via a traffic-shaping network port, only during the duration t1, wherein the traffic-shaping network port is configured to establish a pre-determined inter-packet gap for packets output by the traffic-shaping network port.

It will be still further appreciated that the several variants and details of the methods described above are equally applicable to the corresponding systems.

As will be readily understood by those familiar with network device design, several of the various functional blocks of the systems and nodes described herein, including the sender-side node 210, receiver-side node 220, and SDN controller 230 shown in FIG. 2, may be implemented using digital logic and/or one or more microcontrollers, microprocessors, or other digital hardware. Further, several of the functional elements of these systems and nodes, such as queuing hardware and parts of the packet-processing nodes, may be provided through the use of dedicated hardware. These nodes may comprise hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network devices will appreciate the cost, performance, and maintenance tradeoffs inherent in these design choices.

With these and other variations and extensions of the present invention in mind, it should be appreciated that the foregoing description and the accompanying drawings represent non-limiting examples of the methods and apparatus taught herein for generating a high-precision packet train in a packet processing platform. As such, the inventive apparatus and techniques taught herein are not limited by the foregoing description and accompanying drawings. Instead, the present invention is limited only by the following claims and their legal equivalents.

What is claimed is:

1. A method for generating a high-precision packet train in a network node, for transmission through a data communications network, the method comprising:
    configuring an initial packet generation flow in the network node, the initial packet generation flow having a duration T;
    sending a packet to a loopback port to initiate the initial packet generation flow in the network node, wherein the loopback port loops packets back to the network node or recirculates packets within the network node, wherein the loopback port is configured for traffic shaping, and wherein said traffic shaping establishes a pre-determined inter-packet gap for packets output by the loopback port;
    prior to expiration of the duration T, configuring a main packet generation flow in the network node, the main packet generation flow having a duration t1 that commences upon expiration of the duration T;
    sending looped back packets in the network node to the loopback port for the entirety of durations T and t1; and
    sending one copy of each looped back packet in the network node to the data communications network, via a network port, only during the duration t1.

2. The method of claim 1, wherein configuring the initial packet generation flow and configuring the main packet generation flow are performed using OpenFlow standard constructs.

3. The method of claim 2, wherein configuring the main packet generation flow comprises:
    configuring an OpenFlow table with a Group entry specifying the main packet generation flow; and
    setting a priority for the main packet generation flow to be lower than a priority for the initial packet generation flow.

4. The method of claim 1, wherein the loopback port comprises a port communicatively connected to a traffic-shaping queue.

5. The method of claim 4, wherein the network node implements the OpenFlow standard and wherein the traffic-shaping queue is configured outside the OpenFlow domain.

6. The method of claim 4, wherein the network node implements the OpenFlow standard and wherein the traffic-shaping queue is configured, according to the OpenFlow standard, to have a MINIMUM RATE equal to a MAXIMUM RATE, where the predetermined inter-packet gap is based on the MINIMUM RATE and MAXIMUM RATE.

7. The method of claim 1, wherein the loopback port comprises an external loopback path between two physical ports of the network node.

8. The method of claim 1, wherein the loopback port comprises a loopback path that is internal to the network node.

9. The method of claim 1, further comprising incrementing a source port parameter in the copy of each looped back packet sent to the data communications network, via the network port.

10. The method of claim 9, wherein the network node implements the OpenFlow standard and wherein configuring the main packet generation flow in the network node comprises configuring an OpenFlow table with N Group entries, each of the N Group entries being configured to be valid only during the duration t1, where N is the number of packets to be sent to the data communications network during the duration t1, and where each of the N Group entries includes (i) OXM match criteria for a different source port, the source ports corresponding to the N Group entries ranging from P to P+N−1, and (ii) an action to set a source port, in response to a match, to the source port matching value for the Group entry plus one.

11. A method for generating a high-precision packet train in a network node, for transmission through a data communications network, the method comprising:
    configuring an initial packet generation flow in the network node, the initial packet generation flow having a duration T;
    sending a packet to a loopback port to initiate the initial packet generation flow in the network node, wherein the loopback port loops packets back to the network node or recirculates packets within the network node;
    prior to expiration of the duration T, configuring a main packet generation flow in the network node, the main packet generation flow having a duration t1 that commences upon expiration of the duration T;
    sending looped back packets in the network node to the loopback port for the entirety of durations T and t1; and
    sending copies of looped back packets in the network node to the data communications network, via a traffic-shaping network port, only during the duration t1, wherein the traffic-shaping network port is configured to establish a pre-determined inter-packet gap for packets output by the traffic-shaping network port.

12. The method of claim 11, wherein configuring the initial packet generation flow and configuring the main packet generation flow are performed using OpenFlow standard constructs.

13. The method of claim 12, wherein configuring the main packet generation flow comprises:
configuring an OpenFlow table with a Group entry specifying the main packet generation flow; and
setting a priority for the main packet generation flow to be lower than a priority for the initial packet generation flow.

14. The method of claim 11, wherein the traffic-shaping network port comprises a network port attached to a traffic-shaping queue.

15. The method of claim 14, wherein the network node implements the OpenFlow standard and wherein the traffic-shaping queue is configured outside the OpenFlow domain.

16. The method of claim 14, wherein the network node implements the OpenFlow standard and wherein the traffic-shaping queue is configured, according to the OpenFlow standard, to have a MINIMUM RATE equal to a MAXIMUM RATE, where the predetermined inter-packet gap is based on the MINIMUM RATE and MAXIMUM RATE.

17. The method of claim 11, wherein the loopback port comprises an external loopback path between two physical ports of the network node.

18. The method of claim 11, wherein the loopback port comprises a loopback path that is internal to the network node.

19. The method of claim 11, further comprising incrementing a source port parameter in the copy of each looped back packet sent to the data communications network, via the traffic-shaping network port.

20. The method of claim 19, wherein the network node implements the OpenFlow standard and wherein configuring the main packet generation flow in the network node comprises configuring an OpenFlow table with N Group entries, each of the N group entries being configured to be valid only during the duration t1, where N is the number of packets to be sent to the data communications network during the duration t1, and where each of the N Group entries includes (i) OXM match criteria for a different source port, the source ports corresponding to the N Group entries ranging from P to P+N−1, and (ii) an action to set the source port, in response to a match, to the source port matching value for the Group entry plus one.

21. A system for generating a high-precision packet train for transmission through a data communications network, the system comprising:

a Software-Defined Networking (SDN) controller configured to configure an initial packet generation flow in a packet-processing node, the initial packet generation flow having a duration T, and to configure a main packet generation flow in the packet-processing node, during the duration T, the main packet generation flow having a duration t1 that commences upon expiration of the duration T; and
the packet-processing node, wherein the packet-processing node is configured to respond to the configuring of the initial packet generation flow and main packet generation flow by: (i) sending a packet to a loopback port to initiate the initial packet generation flow, wherein the loopback port is configured for traffic shaping, and wherein said traffic shaping establishes a pre-determined inter-packet gap for packets output by the loopback port, (ii) directing looped back packets to the loopback port for the entirety of durations T and t1, and (iii) sending one copy of each looped back packet to the data communications network, via a network port, only during the duration t1.

22. A system for generating a high-precision packet train for transmission through a data communications network, the system comprising:
a Software-Defined Networking (SDN) controller configured to configure an initial packet generation flow in a packet-processing node, the initial packet generation flow having a duration T, and to configure a main packet generation flow in the packet-processing node, during the duration T, the main packet generation flow having a duration t1 that commences upon expiration of the duration T; and
the packet-processing node, wherein the packet-processing node is configured to respond to the configuring of the initial packet generation flow and main packet generation flow by: (i) sending a packet to a loopback port to initiate the initial packet generation flow in the network node, wherein the loopback port loops packets back to the packet-processing node or recirculates packets within the packet-processing node, (ii) sending looped back packets in the packet-processing node to the loopback port for the entirety of durations T and t1, and (iii) sending copies of looped back packets in the packet-processing node to the data communications network, via a traffic-shaping network port, only during the duration t1, wherein the traffic-shaping network port is configured to establish a pre-determined inter-packet gap for packets output by the traffic-shaping network port.

\* \* \* \* \*